United States Patent

[11] 3,576,239

| [72] | Inventors | Ralph S. Hajek<br>Villa Park;<br>Ray W. Harrow; Edward D. Duke,<br>Chicago, Ill. |
|---|---|---|
| [21] | Appl. No. | 882,981 |
| [22] | Filed | Dec. 8, 1969 |
| [45] | Patented | Apr. 27, 1971 |
| [73] | Assignee | International Harvester Company<br>Chicago, Ill. |

[54] ACCELERATOR LINKAGE LOCK
12 Claims, 3 Drawing Figs.

[52] U.S. Cl. .................................................. 192/3,
 123/103
[51] Int. Cl. ..................................................F16d 67/00,
 F02d 11/00
[50] Field of Search........................................... 192/3 (T),
 3; 123/103, 103 (E)

[56] References Cited
UNITED STATES PATENTS

| 2,712,762 | 7/1955 | Pavlik, Jr. et al. | 192/3(T)X |
| 2,810,461 | 10/1957 | Seay | 192/3(T) |
| 3,111,210 | 11/1963 | Clifton | 192/3(T) |
| 3,158,239 | 11/1964 | Marette et al. | 192/3 |
| 3,180,464 | 4/1965 | Ballard | 192/3(T) |
| 3,215,222 | 11/1965 | Parker | 123/103(E) |
| 3,243,022 | 3/1966 | Humphrey | 192/3 |
| 3,331,477 | 7/1967 | Trifiletti et al. | 192/3(T) |
| 3,366,204 | 1/1968 | Couffer, Jr. | 192/3(T) |

*Primary Examiner*—Al Lawrence Smith
*Attorney*—Noel G. Artman

ABSTRACT: Holding and release lock for an accelerator pedal. A holding device for the accelerator pedal is applied by air under pressure admitted through a manual valve from a pressure source otherwise used to operate a fluid motor for a brake. When the brake is applied, the holding device is released in response to the flow of air from the source to the fluid motor causing the brake to be applied.

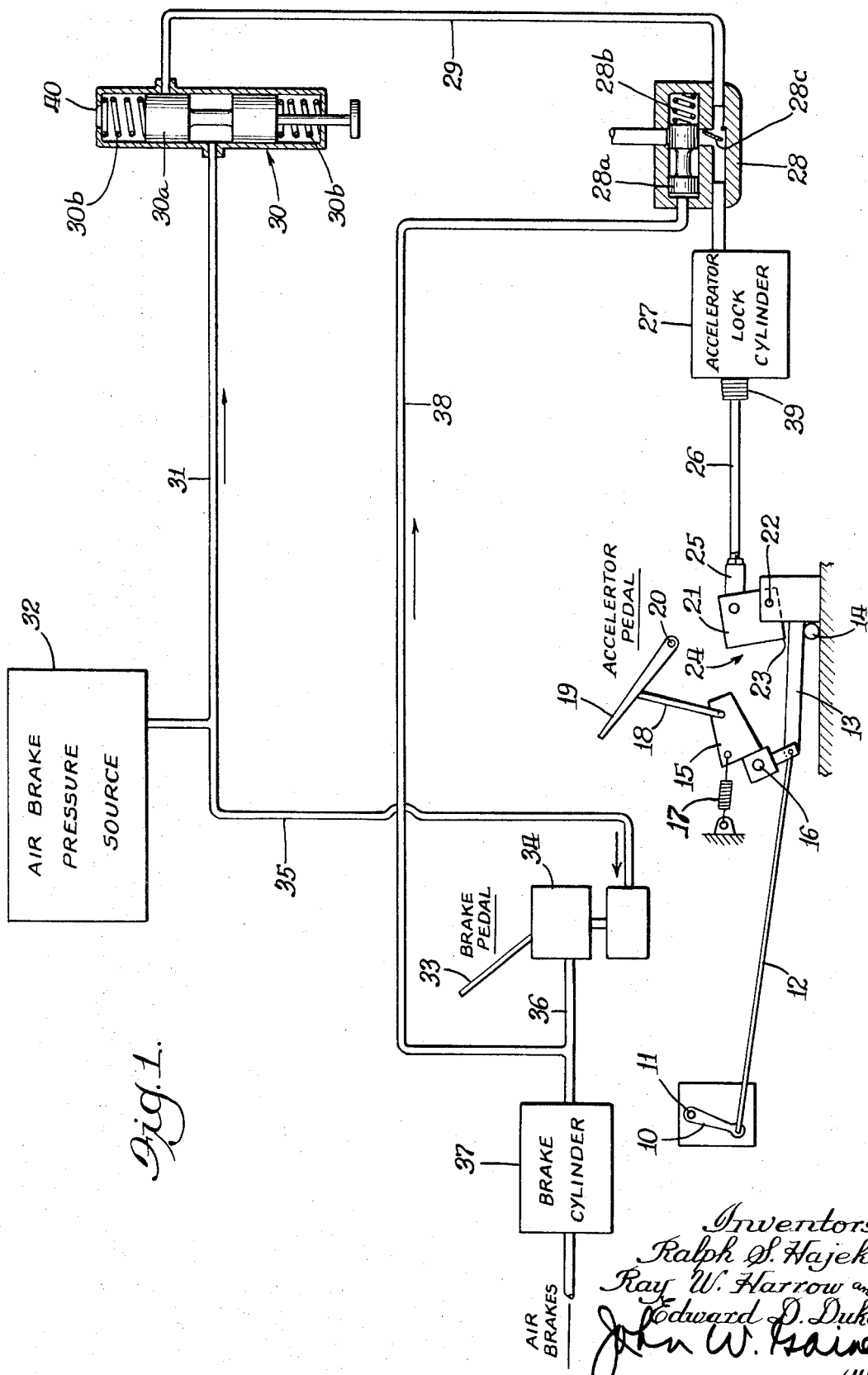

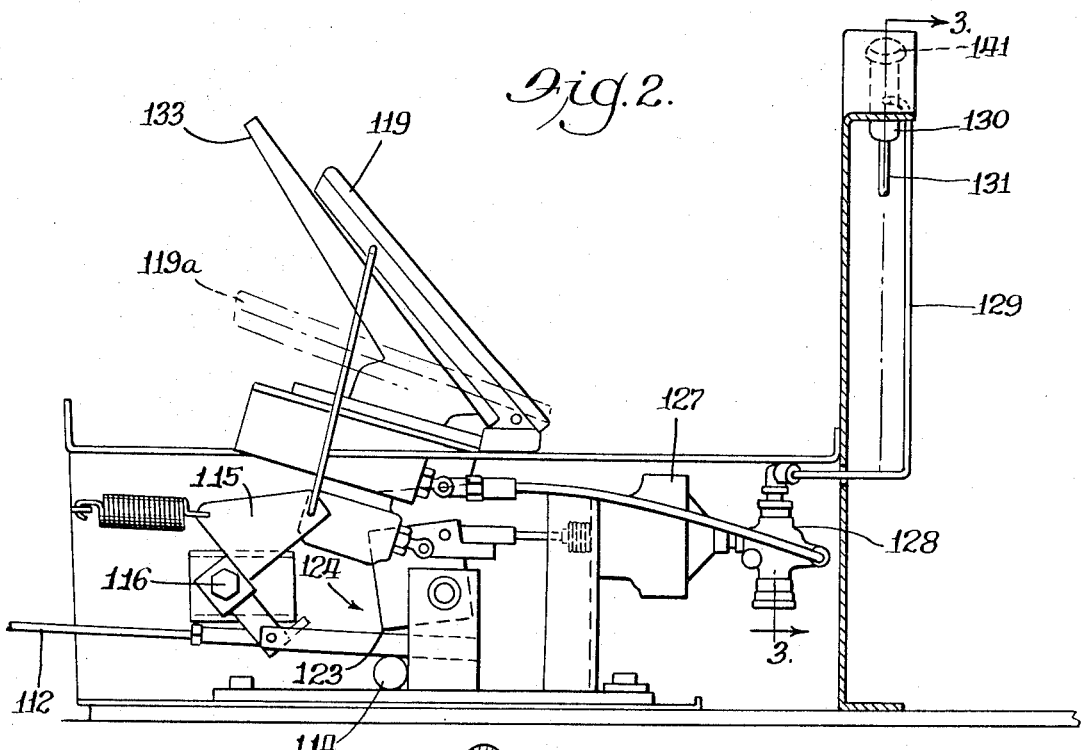
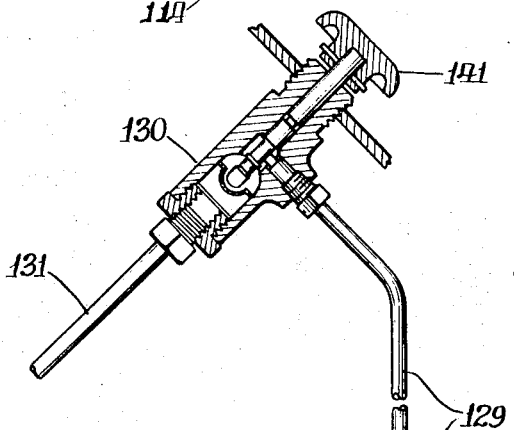
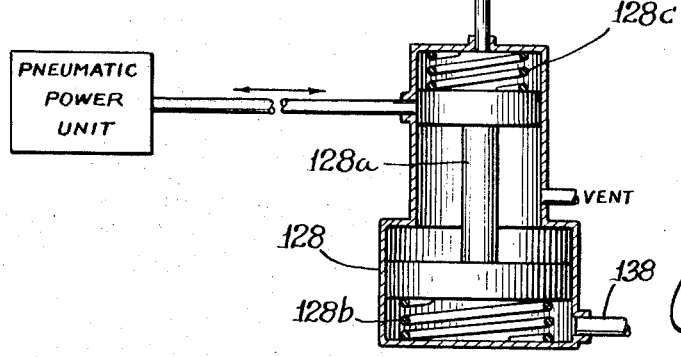

3,576,239

ACCELERATOR LINKAGE LOCK

This invention relates to the release and holding of an accelerator pedal linkage for a vehicle. More specifically, the invention relates to the holding of an accelerator linkage by a lock, and the automatic unlocking thereof in response to a condition of vehicle operation such as the application of brakes to the vehicle.

There are various times when it is desirable to operate a vehicle with the control member for engine speed in a fixed position. The vehicle operator may be too active with other things to give close attention to holding the engine to a fixed speed. Various schemes have been proposed and used for this type of operation, but they have involved an extra system such as a complicated electrical or mechanical device that is an unneeded burden to the vehicle.

We propose to simplify the release of an engine control member by operation of a brake by carrying out such release entirely with the help of a pneumatic source normally used to apply the brake. Thus, there is no need to go to an extra system, and only a minimum number of parts is needed to adapt the pneumatic source to release of the engine control member.

Such simplification is readily accomplished to eliminate the more common hydropneumatics, hydraulics, mechanical trip devices, and electricity in accordance with our invention, as will now be explained in detail. Features, objects, and advantages will either be specifically pointed out or become apparent when, for a better understanding of the invention, reference is made to the following description taken in conjunction with the accompanying drawings which show certain preferred embodiments thereof and in which:

FIG. 1 is a schematic showing of an air-operated brake and accelerator system embodying our invention and controlling power settings, acceleration, and braking of a vehicle;

FIG. 2 shows a modification, in elevation, from the left side of the vehicle operator, now shown; and FIG. 3 is an elevational view of a vehicle taken along the line III—III of FIG. 2 and viewing toward the face of the operator, now shown.

The reference character 10 designates a pivotally mounted control member whose position determines the setting of a fuel pump and the speed of an engine (not shown) for a vehicle also not shown. The member 10 is a governor-connected, power setting lever pivoted at 11 at the end on the pump. The free end of the member 10 is connected to one end of a link 12. The other end of the link 12 is connected to a sliding bar 13 which engages a stationary round bar 14. A bellcrank 15 having a pivot 16 is connected to the link 12 and the sliding bar 13. The bellcrank 15 is also connected to a spring 17 and the link 18. The link 18 is also connected to a foot control which may be a conventional accelerator pedal 19 having a pivot 20.

A block 21 which is pivotally mounted at 22 has a corner 23 adapted to engage the sliding bar 13. The sliding bar 13, the stationary round bar 14, and the pivoted block 21 constitute a lock or holding means 24 for fixing the angular position of the engine control member 10. A clevis 25 connects the block 21 with a rod 26 secured to a movable diaphragm (not shown) forming part of a pneumatic power unit 27. The power unit 27 is connected to a release valve 28 comprising a movable part 28a and a spring 28b, and further comprising a check valve 28c which unseats in the direction of the unit 27. The valve 28 is connected in a path for air leading from the check valve 28c, thence through a line 29 to a manually operated valve 30 comprising a movable part 30a and a pair of springs 30b. A line 31 connects the valve 30 with a source 32 of air under pressure, preferably the airbrake tank of the vehicle.

A pivoted brake pedal 33 operates a brake valve 34 which is connected by a line 35 with the air source 32 and by a line 36 with a fluid motor 37 for operating brakes (not shown). The line 36 is connected with the release valve 28 by an unloader line hose 38. The spring 17 acting through the bellcrank 15 and the link 18 urges the accelerator pedal 19 in a clockwise direction as viewed in the drawing.

When the engine is to be speeded up, the operator depresses the accelerator pedal 19 which acts through the link 18 and the bellcrank 15 to advance the sliding bar 13 in a direction which is to the left as viewed in the drawing. The link 12 is caused to move to the left and acts upon the engine control member 10 to produce the desired engine speed. When this is achieved, part 30a of valve 30 is moved upwards as viewed in the drawing so as to connect line 29 with line 31 by way of a reduced region of part 30a and thus to supply air under pressure from the source 32 through line 31, valve 30, line 29, and valve 28 against the diaphragm in the power unit 27. This results in a leftward movement of the rod 26 and a counterclockwise movement of the block 21, producing engagement of the edge 23 thereof with the sliding bar 13. Thus, the sliding bar 13 is held or locked between the block 21 and the round bar 14, and the angular position of the engine control member 10 is fixed.

When the vehicle brake is to be applied, it is highly desirable to reduce engine speed. Depressing the brake pedal 33 opens the valve 34 to supply air under pressure through the line 36 to the fluid motor 37, which is actuated to apply the brake. The air pressure transmitted to the line 36 by opening of the valve 34, also acts in the unloader line 38, connected with the line 36, to shift movable part 28a of release valve 28, whereby a reduced region of movable part 28a is brought opposite a vent opening in valve 28 and the power unit 27 is vented to atmosphere. A tension spring 39 which is positioned on the rod 26 and acts between the rod and the casing of the power unit 27, moves the rod 26 and clevis 25 to the right as viewed in the drawing, swinging the block 21 clockwise and taking the edge 23 thereof out of engagement with the sliding bar 13. Thus, the sliding bar is released, and the spring 17 acts through the bellcrank 15 and the link 12 to swing the engine control member 10 to a position for lowered engine speed.

Release of the engine control member 10 for lowered engine speed has been made dependent upon application of the vehicle brake. This is carried out from the pressurized air source 32, which is already present for actuating the fluid motor 37 for power operation of the vehicle brake.

The engine control member 10 may also be released by actuation of the manually operable valve 30. In this event, the movable part 30a of valve 30 is moved downwards as viewed in the drawing so that the end of movable part 30a clears the line 29, whereby same is connected to atmosphere through a vent opening 40. Thus, the power unit 27 is vented, and the spring 39 acts through the rod 26 and clevis 25 to make the block 21 release the sliding bar 13.

In actual practice, a construction can be provided simplifying structure of the manually operated valve 30 and consolidating the structure of the release valve 28.

Exemplary of modified means with the simplified and consolidated construction referred to is one physically constructed embodiment of the invention as shown according to FIGS. 2 and 3.

MODIFIED EMBODIMENT—FIGS. 2 AND 3

In this embodiment, reference numerals are used corresponding to the preceding embodiment, but differentiated in the present embodiment by the prefix 1, usually in the hundreds' place. The numerals and parts are:

Solid line accelerator position 119;
broken line accelerator position 119a;
charge and release valve 128;
horn valve 130;
brake pedal 133;
air signal conduit 138;
lock 124;
second cylinder 127;
air signal conduit 129;
valve spool 128a;
brake valve 134;
air signal branch 139;
tank-connected conduit fitting 140;

valve handle 141.

The embodiment is contemplated for the same use previously described, namely, use in an engine-powered vehicle having an airbrake system, not shown, an airbrake tank for the compressed air of the system, and a brake cylinder in the system for power engagement and release of the airbrakes.

In operation, the interacting components of the embodiment are a lockable accelerator linkage 124 for establishing and for adjusting engine power at 112, a second cylinder 127 for selectively locking and unlocking the linkage, a pressure-operated valve 128 connected to the second cylinder for selectively charging and venting same to do the locking and unlocking aforesaid, a first conduit 140 pneumatically disposed between the airbrake tank and each of the brake cylinder and pressure-operated valve, and having individual branches 138, 139 to the latter two to initiate airflow to engage the brakes and unlock the linkage at once, and a second conduit 129 pneumatically disposed between the tank and pressure-operated valve, the latter conduit including a check valve 128a leading one way to the second cylinder to open up airflow thereto and reseat, locking the linkage.

Components affording operator control in this embodiment are a first valve 134 connected to the first conduit 140 and operated by the brake pedal 133, a second valve 130 connected in the second conduit 129 and operated by a handle 141, and an accelerator pedal 119 which is connected to a power setting linkage 112 and to which the second cylinder 127 is releasably connected by means of the lock 124.

A hand tap by the operator on the valve handle 141 which can be immediately released thereafter is all the motion necessary to unseat the horn valve 130 and transmit an air locking signal. Airflows in the line 129, forces down the valve spool 128a as viewed in FIG. 3, and charges the pneumatic power unit to lock the accelerator pedal in any position set by the operator. The flow is one way, because a bottom recentering spring 128b recenters the spool 128a immediately upon termination of the air signal to prevent flow reversal from the pneumatic power unit.

A tap and release or else sustained pressure on the brake pedal 133 by the operator is all that is necessary to send an air release signal. Air flows through the unloader hose 138 and shifts upwardly the spool 128a from the position as shown in FIG. 3. Back pressure on the pneumatic power unit is immediately relieved because the airflows to vent along the small diameter portion of the spool 128a. When the operator's foot leaves the brake pedal, the unloader hose 138 vents and the temporarily compressed recentering spring 128c reexpands in coaction with the spring 128b to cause the spool 128a to be spring centered again.

The sole release is through the unloader hose 138, automatically with foot brake operation, and no hand valve is provided.

We claim:

1. In a vehicle, a source of fluid under pressure, a brake valve for passing pressure fluid from the source to operate a brake stopping the vehicle, a speed-control member for an engine driving the vehicle, means for holding the speed-control member in a predetermined position, a manual valve independent of the brake valve for actuating the holding means by pressure fluid from the source and for releasing the holding means, and a release valve connected between the brake valve and the brake for releasing the holding means in response to passage of pressure fluid from the source through the brake valve.

2. In an automatic vehicle, a fluid motor operatively connected to apply a brake for stopping the vehicle, a source of fluid under pressure, a brake valve, and operating member for the brake valve adapted to make it pass pressure fluid from the source to the fluid motor for applying the brake, a control member whose position determines the speed of an engine driving the vehicle, means for holding the control member in a predetermined position, a manual valve operated independently of the brake valve and its operating member for actuating the holding means by pressure fluid from the source, and a release valve operated by pressure fluid from the source in response to passage of pressure fluid from the source to the fluid motor for releasing the holding means.

3. In a vehicle, a brake for stopping the vehicle, a source of fluid under pressure, a fluid motor for applying a brake to stop the vehicle, a line leading from the source to the fluid motor, a brake valve in the line for passing pressure fluid through the line to the fluid motor for applying the brake, a speed-control member for an engine driving the vehicle, means for holding the speed-control member in a predetermined position, a manual valve for admitting pressure fluid from the source to the holding means independently of the brake valve to actuate the holding means, and a release valve connected to the line between the brake valve and the fluid motor for releasing the holding means in response to opening of the brake valve and passage of pressure fluid from the source through the valve and the line to the fluid motor.

4. In an automatic vehicle, a control member whose position determines the speed of an engine for driving the vehicle, a fluid motor operatively connected to apply a brake stopping the vehicle, a source of fluid under pressure, a first line for supplying fluid under pressure from the source to the fluid motor, a first valve connected in the line, a brake member for operating the valve, means for holding the control member in a predetermined position, a second line connecting the source and the holding means independently of the brake member and the first valve, a second valve in the second line for admitting fluid under pressure from the source through the second line to the holding means to apply the same, a third valve connected in the second line between the second valve and the holding means, and a third line connecting the third valve and the first line between the first valve the fluid motor for causing actuation of the brake member and the resultant flow of fluid in the first line for the first valve to the fluid motor to open the third valve and thereby to release the holding means.

5. In a vehicle, a source of gas under pressure, means for utilizing gas from said source to operate a brake stopping the vehicle, a speed-control member for an engine driving the vehicle, means for holding the speed-control member, means operated independently of the brake and the means operating the brake, on gas from the source to actuate the holding means, and means operated on gas received from the source by way of the operating means for the brake to release the holding means in response to operation of the brake.

6. In a vehicle, an airbrake pressure source, a brake member for operating from the source a brake stopping the vehicle, a speed-control member for the vehicle, means for holding the speed-control member in a fixed position, means utilizing gas from the pressure source independently of the operation of the brake means to actuate the holding means, and means utilizing gas from the pressure source by way of the brake member to make the holding means release the speed-control member in response to operation of the brake.

7. In an engine-powered vehicle having an airbrake system:
an airbrake tank for the compressed air of the system;
brake cylinder means in the system for power engagement and release of the airbrake;
lockable accelerator linkage means (124) for establishing and for adjusting engine power;
second cylinder means (127) for selectively locking and unlocking the linkage;
pressure-operated valve means (128) connected to the second cylinder means for selectively charging and venting same to do the locking and unlocking aforesaid;
first conduit means (140) pneumatically disposed between the tank and each of the brake cylinder means and pressure-operated valve means, and having individual branches (138, 139) to the latter two to initiate airflow to engage the brakes and unlock the linkage at once; and
second conduit means (129) pneumatically disposed between the tank and pressure-operated valve means, the latter including one-way flow means (128a) leading to the second cylinder means to open up airflow thereto and reseat, locking the linkage.

8. The invention of claim 7, characterized by an operator-operated valve (130) connected in the second conduit means to control the locking aforesaid.

9. The invention of claim 7, characterized by a first operator-operated valve (134) connected in the first conduit means for admitting air to the two branches; and a second operator-operated valve in the second conduit means for admitting air to the one-way flow means.

10. The invention of claim 9, further characterized by a handle (141) connected to the second operator-operated valve.

11. The invention of claim 9, further characterized by a brake pedal (133) connected to the first operator-operated valve; and an accelerator pedal (119) connected to the accelerator linkage means.

12. The invention of claim 9, further characterized by a brake pedal (133) connected to the first operator-operated valve; and a handle (141) connected to the second operator-operated valve.